Feb. 16, 1971   F. RESTIVO ET AL   3,564,511
DATA TRANSMISSION SYSTEM HAVING A CENTRAL COMPUTER
AND TERMINAL APPARATUS
Filed Oct. 3, 1968   6 Sheets-Sheet 1

Fig.1

INVENTOR.
FRANCESCO RESTIVO
FRANCESCO SERRACCHIOLI

*INVENTOR.*
*FRANCESCO RESTIVO*
*FRANCESCO SERRACCHIOLI*

Fig. 6

United States Patent Office 3,564,511
Patented Feb. 16, 1971

3,564,511
DATA TRANSMISSION SYSTEM HAVING A CENTRAL COMPUTER AND TERMINAL APPARATUS
Francesco Restivo, Cascinette d'Ivrea, and Francesco Serracchioli, Banchette, Italy, assignors to Ing. C. Olivetti & C., S.p.A., Ivrea, Italy, a corporation of Italy
Filed Oct. 3, 1968, Ser. No. 764,708
Claims priority, application Italy, Oct. 3, 1967, 53,221/67
Int. Cl. G06f 3/04, 15/16
U.S. Cl. 340—172.5                    17 Claims

ABSTRACT OF THE DISCLOSURE

A data transmission system having a central computer and terminal apparatus that transmits and receives data from the computer, the terminal apparatus having a programming unit that controls functions thereof and is responsive to service characters associated with blocks of characters constituting the data that is transmitted by the computer to cause programmed sequences of operation.

CROSS REFERENCE TO RELATED APPLICATION

Applicants claim priority from corresponding Italian patent application Ser. No. 53,221/67, filed on Oct. 3, 1967.

BACKGROUND OF THE INVENTION

Field of the invention

The present invention relates to a system for the transmission of data between a terminal interrogation and response apparatus and a central computer connected therewith for the purpose of providing, for example, consultation and up to date real time maintenance of the central records, as well as compilation in peripheral positions of the necessary accounting documents in sure and rapid manner. The terminal apparatus may comprise a peripheral part having printing units and a keyboard for writing in and checking connected to electronic stores, and arrangements for control and transmission through particular interface units to provide a coded alphanumerical output and an electrical input that is alphanumerical or numerical only.

DESCRIPTION OF THE PRIOR ART

Data transmission systems known in the art possess terminal units of little flexibility inasmuch as their cooperation with the central computer or data processor is normally limited to functions of reception and transmission that are pure and simple. A certain complexity of local operations is possible in known terminal units but only at the expense of accompanying the data sent by the computer with a large number of service instructions having compilation and supervision requirements that constitute an intolerable load on the central computer.

SUMMARY OF THE INVENTION

In contradistinction to such prior art systems, the data transmission system according to the invention allows great flexibility of local duty. There is provided a data transmission system comprising a central computer and a terminal apparatus for transmitting data to and receiving data from the computer. The terminal apparatus comprises a programming unit arranged to control functions of the terminal apparatus and is responsive to service characters associated with blocks of characters constituting the data and transmitted by the computer to cause programmed sequences of operations to be performed.

BRIEF DESCRIPTION OF THE DRAWINGS

FIGS. 2a and 2b show the flowsheet for the dialog procedure between the apparatus of FIG. 1 and a central unit;
FIG. 3 shows how
FIGS. 2a and 2b are joined together;
FIG. 5a, b, c and d show the signals concerning the timing, regeneration, reading and writing of the store.

DETAILED DESCRIPTION OF THE INVENTION

Figure 1:
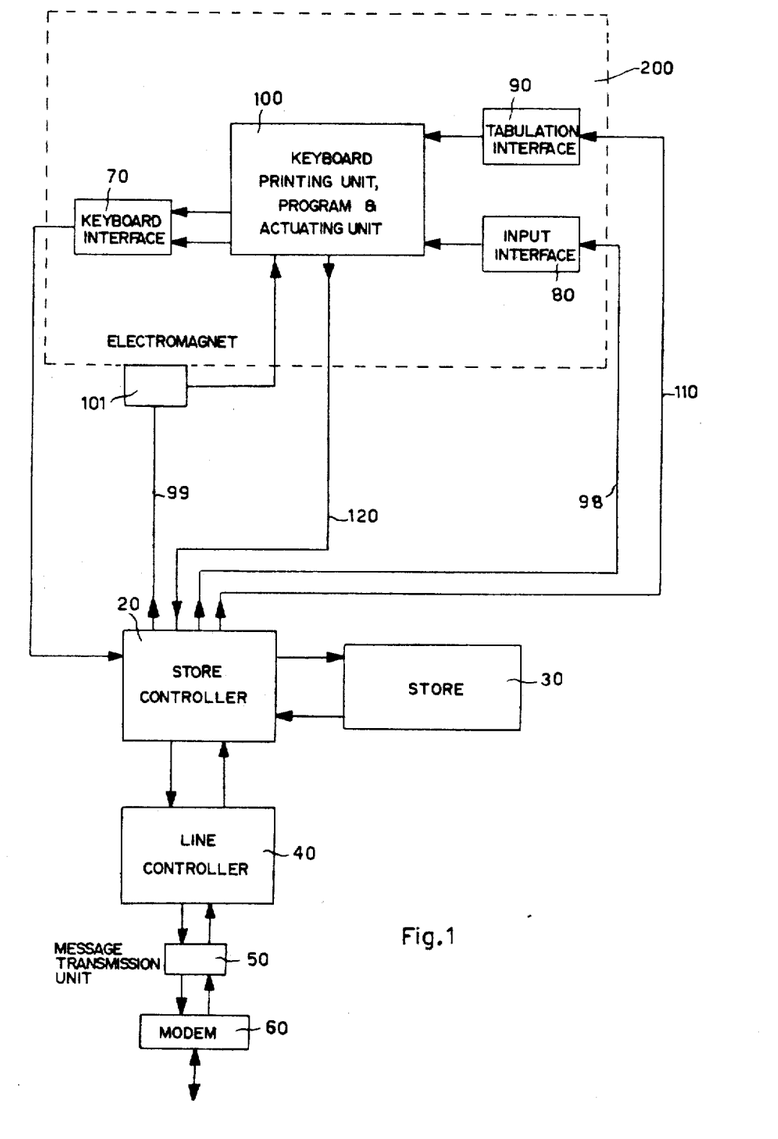
FIG. 1 is a block diagram of an embodiment of an interrogation and response apparatus.

Referring to FIG. 1, block 200 represents a mechanical accounting machine of known type comprising a keyboard, a printing unit, a program and actuating unit 100, and the necessary electronic interface blocks 70, 80, and 90. The keyboard comprises an alphanumerical part, similar to an ordinary typewriter keyboard, a numerical part, and service and control keys. The program unit comprises an automatic programming device of the type described in British patent specifications Nos. 773,004, which corresponds to U.S. Pat. 2,849,179, and 857,437, which corresponds to U.S. Pat. 3,006,540, having a programming bar in which stop and operating stops indicating the successive stop positions of the carriage, the calculating operations, the printing operations, as well as other operating modes that the machine is required to execute, in correspondence to each stop, are inserted.

The information structure is conditioned by the programming exigencies of the mechanical accounter so that it is necessary to appropriately coordinate the programming work of the terminal and the central data processor which are matched in order to secure the required automatic performance and the desired message structure.

The message sent from the terminal to the computer is always prefixed by start text character STX which is automatically inserted. This is followed by the text proper of the message divided into numerical and alphanumerical zones, the individual zones being preceded by service characters indicating the nature of the data which follows. The data block terminates with character ETB if required to indicate the finish of a block of an uncompleted message, or with character ETX if required to indicate the end of a completed message. The text proper and characters ETB and ETX are composed on the keyboard while the service codes are inserted into the data flow by the accounting machine's mechanical program.

The message sent by the computer to the terminal is prefixed by service signal STX indicating start of text. This is followed by the text of the message which is formed of numerical data each preceded by service character CSN or CSR, which allow the instructions prescribed in the programming bar of the terminal to be rendered operative, the message ending finally with character ETX or ETB, depending upon whether the message is complete or incomplete. A more detailed description of the dialog procedures between terminal and computer will be described hereafter.

The data written on the alphanumerical keyboard is applied directly to interface 70 while that written on the numerical keyboard is applied to interface 70 from a buffer store constituted by a writing slide on the keyboard itself.

The characters arrive at interface 70 in series, each coded as a group of 6 bits in parallel. From interface 70 the message is sent, with the service codes inserted, to store controller 20 which establishes the links between the various units comprising the terminal and determines the sequence of the various interrogation and response phases. Store controller 20 assures inter alia recognition of the various service codes, and on the basis of such identification, activates certain preparatory store functions. After having been decoded in the internal code of the store, the message enters store 30 complete with data and interposed service codes.

Store 30 is a magnetostrictive delay line type with a capacity of 120 alphanumerical characters each of (7+1) bits, the last bit being a parity bit. Its main functions are to collect and store the interrogation messages written in at the terminal and then the response messages coming from the data processor. The ability to store the message, even after its transmission on-line, allows retransmission of the self same message in case of error, without the need for manual writing in. When line controller 40 receives a request from the data processor to send a message, it retrieves the message from store 30 and transmits it on-line.

All characters transmitted are checked by a parity bit which is the eighth bit of the character. In order to improve protection against transmission errors, the parity bit check (tansverse check) is backed up by a longitudinal redundancy check effected by a circuit of the type described in British patent specification, No. 1,086,315, which corresponds to U.S. Pat. 3,381,272. In the case here considered, this circuit forms a redundant character taken from the information bits (excluding STX but including ETX or ETB) according to a particular law. After the character ETB or ETX which closes the block, the terminal sends on-line the aforesaid redundant character which is checked by the receiving unit by comparison with the analogous character which is generated during reception. If this comparison yields a disparate result, retransmission of the block will be requested. The whole message transmitted from message transmission unit 50 with the bits arranged in series is sent to modem 60 which provides modulation of a carrier wave for on-line transmission. Message transmission unit 50 acts as a serializer in transmission and as a distributor in reception.

A similar process is followed by the message sent from the data processor to the terminal. After the preliminary dialog effected between the terminal's line controller 40 and the computer, the former will, if store 30 is free to accept data fro mthe line, give the go-ahead to the computer to send the message. The message arrives at modem 60 which demodulates it, after which it is put in parallel by message transmission unit 50. Then, having passed through line controller 40 and store controller 20 it enters store 30.

At the start of the reception process, the carriage (not shown) of the accounting machine is hard up against a stop fixed by the tabulating bar. Then the various characters of the block transmitted by the computer are received from modem 60 and are fed into store 30 and additionally passed to store controller 20 for recognition of any service characters that may be present.

When either the signal ETB or ETX which close the block of data is received from the line and decoded, store controller 20 sends a pulse by an appropriate line 99 to electromagnet 101 which actuates a motor key on the accounting machine for starting a cycle and, as a result, the carriage moves on to the immediately following stop of the programming bar. In correspondence with this stop, the programming bar is prearranged so as to cause transmission on line 120 of signal Po for retrieving the data from store 30 for dispatch to the accounting machine. The first recall signal thus transmitted causes, as described hereafter, extraction from store 30 of the first character of the block which, as previously mentioned, is the code CSN or CSR that precedes the first zone of the message. This code is identified in store controller 20 and serves to order, through interface circuit 90, selection of the next operative stop on the tabulation bar. It should here be particularly noted that, the accounting machine is provided with a device for selecting the next stop on which it is due to stop. This device is a two-position selector which in one position selects predetermined stops and in the second position selects other predetermined stops. Interface circuit 90 positions the aforesaid device in one or the other position, depending on whether it receives code CSN or CSR from input line 110. The nert stop having been thus selected, the carriage is caused to adavnce from reading of code CSN or CSR itself up to the stop selected.

This new stop to which the carriage is brought has a prescribed program for recalling data from storage, i.e., it again causes dispatch of recall signal Po for input of the characters retrieved from store 30 to the writing-in slide of the accounting machine. More specifically, dispatch of the first recall signal causes the first numerical character of the block to leave store 30 and, after having been decoded, to pass by line 98 through interface 80 and for writing in the slide (serving as a mechanical buffer store and not shown in the figure), pending processing as prescribed by the program of the tabulating bar at the next successive stop.

In a similar fashion successive Po recall signals cause the following successive characters of the block to be written on the slide. However, when the character so retrieved from the store is CSN or CSR, its recognition by store controller 20 causes the carriage to move on to the next operating stop, the selection of which is made on the tabulating bar in accordance with whether the code read is CSR or CSN. In addition, reading of this code blocks further retrieval of data from store 30. In the said next stop, in addition to a further order for retrieval of data for transfer from store 30 to the slide of the characters of the second zone of the block, an order is also furnished for processing the numerical characters previously written in the mechanical buffer store (slide). This order may, for instance, be for transfer to a totalizer and printer or for transfer to a perforator and so on. In accordance with dialog procedure, line controller 40 has the task of superintending:

(1) The preliminary dialog between the terminal apparatus and a central unit such as a computer for the purpose of establishing a communication channel for the transmission of data;

(2) The effective exchange of interrogative and answering messages between the two linked units; and (3) Checking the correctiness of the data transmitted.

The characters of the dialog between terminal apparatus and central unit are such that the initiative for any exchange of data is left to the data processor which controls both the dispatch and reception of the various messages according to the procedure and definite rules.

Figure 2A:
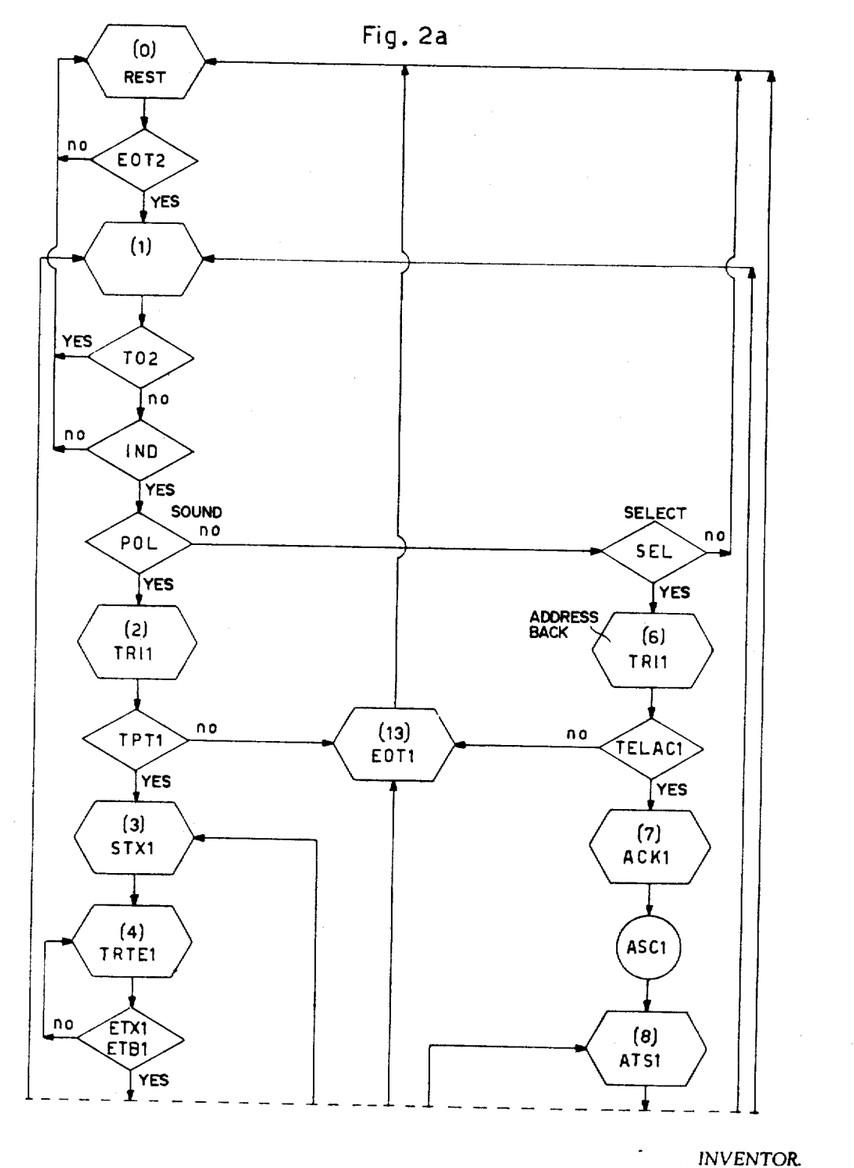
Figures 2B, 3:
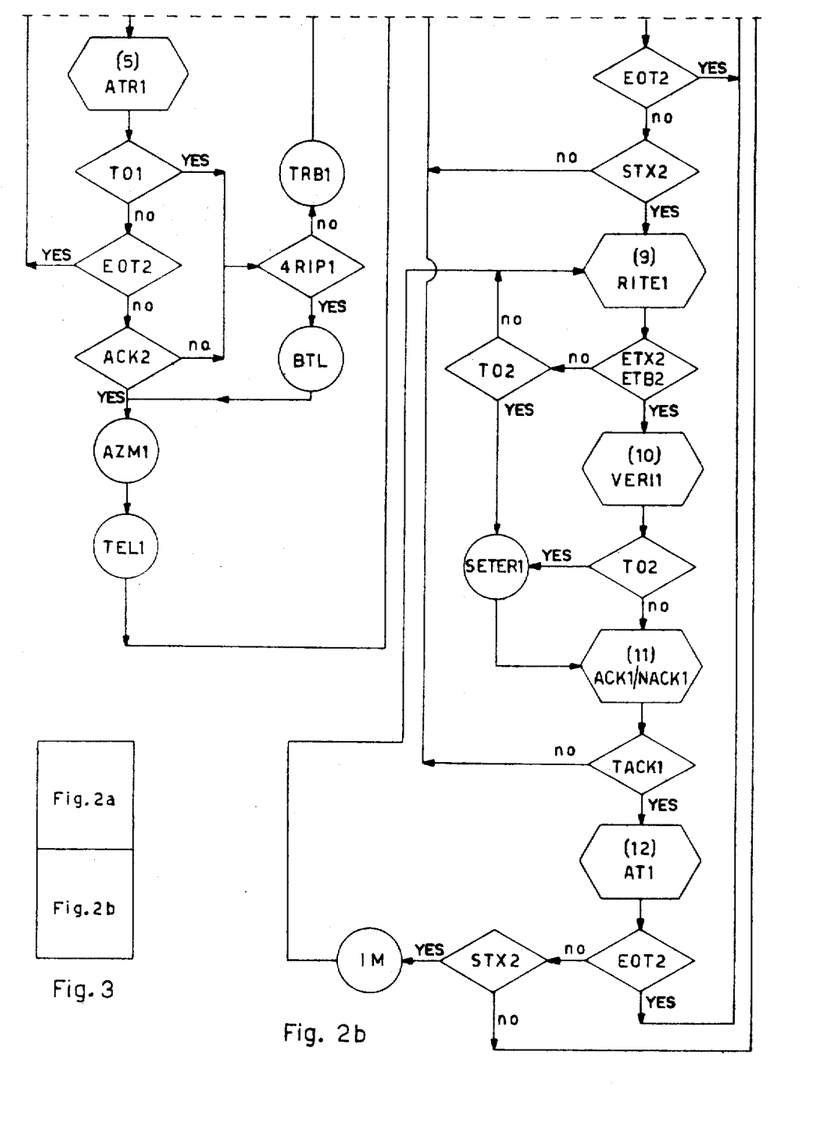

The fllowsheet in FIGS. 2a and 2b is a representation of the dialog procedure between terminal and data processor.

With reference to FIGS. 2a and 2b, the hexagons indicate the states of the terminal as identified by the numerals in parenthesis, the diamonds indicate a logical choice, and the circles indicate an actuating operation on the units of the terminal. The alphabetical abbreviations are suffixed with a numeral 1 or 2 denoting the terminal and computer respectively.

The dialog procedures can in essence be reduced to the following:

(1) A "sounding" procedure for dispatch of interrogation messages from the terminal to the central data processor.

(2) A "selection" procedure for transmission of response messages from the data processor to the terminal.

Every "sounding" and "selection" by the central data processor is preceded by dispatch to all terminals thereto connected of a service character EOT which puts the transmission controllers of all terminals connected to the computer into the waiting condition, the said controllers having been initially in the rest state (0). This waiting state is indicated by (1). Should the terminal not receive further characters from the computer within a predetermined time, it reassumes the rest state (0). The next character to come from the computer represents the specific address (IND) which identifies the terminal interrogated by the computer and, at the same time, indicates whether the request from the computer is a "sounding" (POL) or "selection" (SEL). If the address sent by the computer is not that of the terminal considered, then the logical choice IND will be negative and the terminal controller will therefore return to the rest state (0). When it is positive, the following cases are possible:

(1) If the terminal does not recognize either the "sounding" request POL or the "selection" request SEL it will return to the rest position (0).

(2) If the terminal recognizes POL it will assume state (2) wherein it transmits back to the computer the code expressing its proper address TRI1 as acknowledgement.

During the preceding dialog the various terminal units not comprising line controller 40 (store 30, the keyboard, printer, etc.) continue their independent operation under local control. Consequently, at this stage of terminal/computer dialog, the terminal can be in a position to transmit data to the computer or not, i.e., store 30 can be in the "ready to transmit" state TPT1 or not.

If in such case the store is not "ready to transmit," the terminal will assume state (13) wherein it sends character EOT to the computer, whereby control of the conversation is passed back to the computer, and will then automatically return to state (0).

If, on the other hand, store 30 is ready to transmit information to the computer, the terminal will assume state (3) wherein it starts to transmit the first service character STX which precedes the block of information present in store 30. When this is done it assumes state (4) wherein it executes the transmission TRTE1 of the said block of information. The terminal thus continues to transmit until there is retrieved from store 30 the character ETX or ETB which terminates the information block in the case of a complete or incomplete message respectively. After dispatch of character ETB or ETX, the terminal passes into waiting state (5), ATR1, to await the reply from the computer. If this reply is not received on elapse of waiting time TO1, the terminal will effect retransmission TRB1 of the block, i.e., it will return to state (3) wherein it starts to transmit the service character STX stored in the memory and then successively proceeds again through the flowsheet stages already described.

If, after having retransmitted the block of information, the terminal still receives no reply from the computer, the transmission controller will again transmit the block. If, after three repetitions by the terminal of the same information block, a response character (logical choice 4RIP) is still not received from the computer, the terminal transmission controller will order blocking BTL of the keyboard through the local controller and cancellation AZM of the storage contents, i.e., it will prevent regeneration of the contents circulating therein. The store is accordingly placed in the "free" state TEL. After these operations the transmission controller returns to state (13) wherein it transmits service character EOT to the computer, after which the controller reassumes the rest state (0), thus relinquishing the initiative for any further conversation to the computer.

If, on the other hand, the terminal line controller should, after having transmitted the whole block of information, receive in reply service character EOT from the computer before lapse of the waiting time TO1, then the controller will return to waiting state (1) in anticipation of an eventual further interrogation from the computer.

Should the terminal line controller receive from the computer service character ACK, this will mean that the computer has correctly received the block of characters sent to it from the terminal in question, whereby the controller of the terminal in question executes clearance AZM of store 30, placing the latter into "free" state TEL. After these operations the terminal transmission controller assumes state (13) wherein it sends character EOT to the computer, thereby handing over conversation control to the latter, and then returns to the rest state (0).

Should line controller 40 receive from the computer service character NACK by which the computer advises the terminal of incorrect or distorted reception of a block of characters, or should the transmission controller receive from the computer a character other than EOT or ACK, then, in either of these cases, (negative logical choice of ACK) line controller 40 will thrice repeat transmission of the character block concerned thereafter, and the flowsheet having been duly retraversed, if the above-mentioned eventualities do not reoccur, line controller 40 will order blocking of the keyboard (BTL) and clearing of store 30 (AZM). Having put the store in the "free" state, TEL, line controller 40 itself assumes state (13) wherein it transmits service character EOT to the computer and then returns to the initial rest state (0).

It is thus clearly evident from the flowsheet as thus far described that, not only on conclusion of the whole transmission, but also after transmission of every block, the terminal apparatus leaves the computer free to proceed with its own program. In other words, restoration to the computer of control of message transmission at every block allows the computer to resume and finish at some later convenient time a dialog which has already been initiated by dispatch, for example, of the first block of information, such resumption and completion being effected compatibly with the exigencies of the computer's program and agreeably to current traffic requirements. Moreover, the terminal apparatus with its slow-speed writing-in unit in the form of a keyboard and its store 30 with high-speed data retrieval requires relatively long times for preparing a message as compared with the short transmission times, and during these long preparation times it is undesirable for the computer to be kept waiting, for which reason it is expedient to reassign control of terminal-computer dialog to the computer after each block of information.

Returning once more to the flowsheet, if at the start of the dialog procedure line controller 40 recognizes the request from the computer to be one of "selection" SEL, it will assume state (6) wherein it automatically transmits to the computer a character expressing its proper address TRI1 as acknowledgement of receipt. At this point the terminal may be in a position to receive the block of characters from the computer (i.e., with its store in the "free" state or the "assigned to computer" state), or else it may not (decision operator TELAC).

If the store is not ready to receive the block of characters emanating from the computer, line controller 40 will assume state (13) wherein it sends to the computer the service characters EOT, which reassigns control to the latter, and then automatically reassumes the rest state (0). If, on the other hand, store 30 is ready to receive data from the computer, line controller 40 will assume state (7) wherein it transmits the accept character ACK to the computer. Having transmitted this character, the line controller puts the store in the "assigned to computer" state ASC and then itself assumes state (8) wherein it remains awaiting (ATS) the first character to be transmitted by the computer.

If service character EOT arrives from the computer, line controller 40 will assume waiting state (1) in anticipation of eventual dispatch by the computer of the character indicating the specific address of the terminal in accordance with the dialog procedure already described.

If a character other than STX arrives at line controller 40, the latter will assume state (13) wherein it sends the character EOT to the computer and then automatically reassumes the rest state (0). If, on the other hand, the start of text character STX arrives at the terminal transmission controller, then the latter will assume state (9) wherein it carries out reception (RITE) of the text of the message. The terminal thus continues receiving until receipt of a character ETX or ETB.

If the terminal receives the character ETX or ETB it assumes state (10) wherein it verifies (VERI) coincidence of the redundant character sent by the computer immediately after the ETX or ETB characters with the redundant character generated by line controller 40 of the terminal. If such verification is made by the line controller within a predetermined time TO2, the aforesaid controller will assume state (1) wherein it transmits character ACK or NACK depending respectively on whether coincidence of the two redundant characters (that sent by the computer and that generated by the terminal) has been confirmed or not. If redundancy verification takes place after elapse of time TO2, line controller 40 acts through the terminal's local controller to cause illumination (SETER) of an error lamp and then assumes state (1) wherein it transmits to the computer character (NACK), advising the latter of erroneous reception of the text of the message sent.

If line controller 40 does not recognize characters ETX or ETB sent to it at the end of the block by the computer, it will on expiration of a predetermined time TO2 act through the terminal's local controller to illuminate the error lamp and then assume state (11) wherein it transmits to the computer the character NACK. If after having received the block of characters sent by the computer and verified the redundancy, line controller 40 should not have replied to the computer by dispatch of the character ACK (negative choice of two-way logical operator TAK) then the said controller will assume state (8) wherein it awaits repetition of the block sent by the computer or, more precisely, receipt of the character STX prefixing the repeated block.

If, on the other hand, line controller 40 has in fact sent the character ACK, then the controller will assume the wating state (12) ATI.

If the character EOT arrives from the computer, line controller 40 will assume state (1) wherein it awaits the eventual request from the computer. However, it is also possible that character STX will arrive at the line controller. This signifies that the computer has not received character ACK from the terminal or else has received it in distorted form. In either case the computer will be about to re-transmit a block of characters already correctly received by the terminal, for which reason the line controller of the terminal will block the store (IM); i.e., it will not send to the local store controller the permissive signal for reading into the store. Thereafter line controller 40 returns to state (9) for text reception, which reception proceeds as it were off-load; i.e., without affecting the store.

It follows in general from this flowsheet that each new block of information from the terminal apparatus to the central data processor must be authorized by a "sounding" procedure. When, on the contrary, transfer of information is from the central data processor to the terminal apparatus, transfer of each new block is always preceded by the "selection" procedure. Use of this procedure, not only for initiating but also for containing the transfer of information, enables the terminal apparatus to utilize the received information for the necessary length of time which may be longer than the transmission time (for instance, printing from a temporary memory) without thereby engaging the line and the computer for a length of time exceeding that of actual transmission.

The store

The store 30 consists of a magnetostrictive delay line wherein to each character there correspond 10 binary positions together constituting one storage cell. To particularize, positions 3 to 9 are occupied by the 7 bits representing the character, position 10 by the corresponding parity bit, while positions 1 and 2 are intended for containing service bits "bs" and "b1." The initial operation of the store is indicated by a service character with code 0000001. The bit "bs" is a bit which during store writing is gradually displaced to behind the last character written and serves to indicate that after this no further character follows. Conversely, the bit "b1" is a bit which during store reading is gradually displaced to before the character required to be read. A character AS serves to start the timing.

Figure 4:
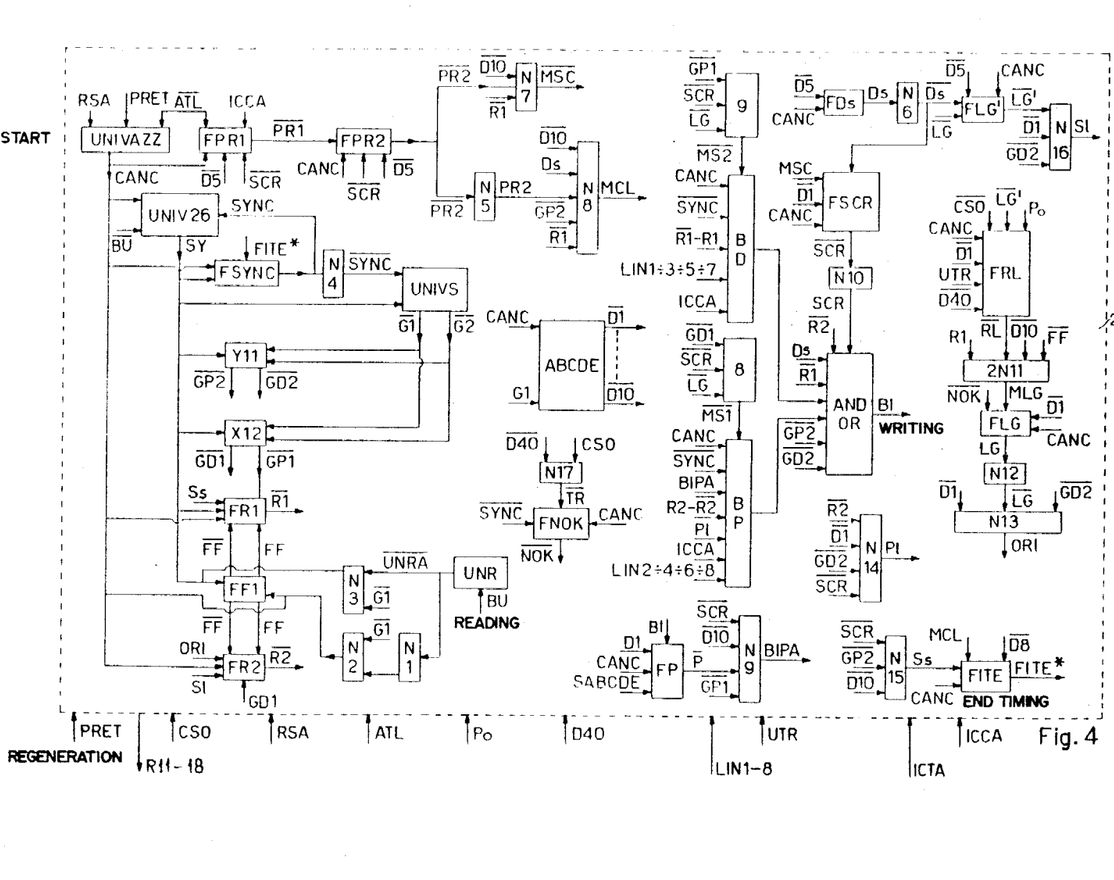
FIG. 4 is a block diagram of a store control unit.

With reference to FIG. 4, NOR gates are indicated by N, and the output of each such gate represents the negation of the logical sum of the inputs. A signal distinguished by a bar, e.g. $\overline{ATL}$, indicates that if the signal ATL is true, $\overline{ATL}$ is false, and vice versa.

The keyboard produces a reservation signal PRET which is passed to circuit UNIVAZZ consisting of a flip-flop generator connected to several NOR logical circuits and when the said circuit is energized by signal $\overline{ATL}$, it produces a signal CANC of duration determined by the circuit components which are producing it. Therefore, as a product of the PRET signals and $\overline{ATL}$, indicating the "free" or "assigned to keyboard" states of the store, a signal CANC is formed, as will be described in more detail later in the line controller section, which fulfills various clearing operations, as for example on the store input-output shift register, the counter ABCDE and nearly all the blocks appearing in FIG. 4.

Figures 5A, 5B:
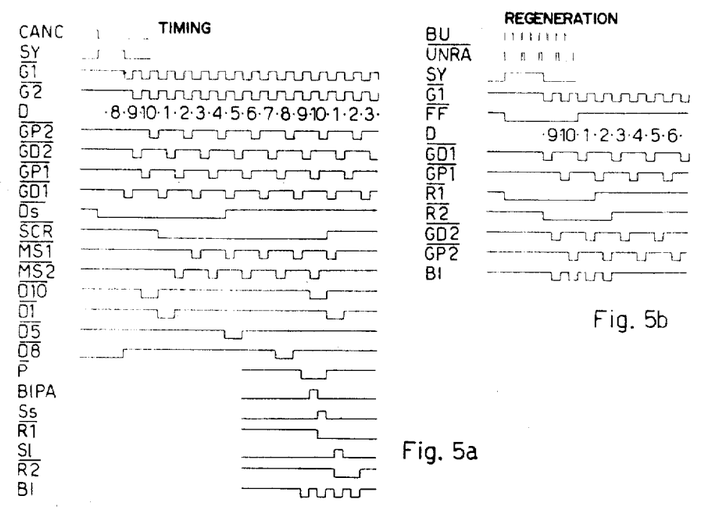

To enable the circuit in FIG. 4 to be better understood, time diagrams of the signals are given in FIGS. 5a, b, c and d.

On fall of signal CANC (its trailing edge), the flip-flop UNIV 26 composed of two NOR gates is triggered and produces the master output SY. The leading edge of SY activates flip-flop FSYNC, the combination of flip-flop plus NOR gates Y11 and X12, and flip-flops FR1 and FF1. The fall of SY, i.e., its trailing edge, triggers UNIVS, which is a circuit composed of flip-flops and NOR gates, thereby generating timing signals $\overline{G1}$ and $\overline{G2}$ which are of square-wave form as shown in FIG. 5a. Under the action of signals $\overline{G1}$ and $\overline{G2}$, NOR gates X12 and Y11 generates signals $\overline{GD1}$, $\overline{GP1}$ and $\overline{GD2}$, $\overline{GP2}$ respectively. Signal $\overline{G1}$ causes an ordinary counter ABCDE to count, which counter is formed of 5 flip-flops plus logical decoding circuits, and is initially forced by signal CANC into state D8. The decoded signals of this counter give the ten time integrals, i.e., the ten signals D1–D10, which define the positions of the ten bits of each character. The trailing edge of the master CANC had previously operated the flip-flops FDs, as a result of which signal Ds authorizes block FSCR, composed of a flip-flop and NOR gate, so that on the first D1 being decoded by block ABCDE, this will be activated and until the next D1, signal $\overline{SCR}$ will remain at zero, as may be seen from FIG. 5a. The condition $\overline{SCR}=0$ enables the two monostable inverters 8 and 9 to produce a master $\overline{MS1}$ and $\overline{MS2}$ for any signal $\overline{GD1}$ and $\overline{GD2}$ respectively. The first master $\overline{MS1}$ is non-operative because the fall to zero of the signals $\overline{SCR}$ and $\overline{GD1}$ is conterminous; the first to be emitted is signal $\overline{MS2}$ by virtue of the first timing signal GP1. There are altogether a total of five $\overline{MS2}$ signals which serve to shift the "odd bits register" BD, composed of 5 flip-flops, and 5 $\overline{MS1}$ signals which serve to shift the "even bits register" BP, likewise composed of 5 flip-flops. The 5 odd flip-flops, not shown separately in the figure, will be referred to as R17, R15, R13, R11, R1S and the 5 even flip-flops as R18, R16, R14, R12 and R1L. These two flip-flop groups form two shift registers known per se in the art. At the start of the timing signals, the leading edge of the master CANC, produced from the PRET signal generated by the keyboard, puts nine of the register flip-flops in the reset condition and the tenth flip-flop (R17) in the set condition. This state corresponds to the presence in the ten BD and BP register flip-flops of service character AS.

The presence of signals $\overline{MS1}$ and $\overline{MS2}$ causes the even bits register BP and the odd bits register BD to shift. In the time interval D9 the conditions $\overline{SCR}=0$, $\overline{GD2}=0$ obtain and flipj-flop R1S is in state ONE so that the "AND/OR" block for writing in the store supplies (BI) one bit which, as will already have been seen, is the only bit of the character AS, which latter is therefore written in the magnetostrictive store. On arrival of the last $\overline{MS2}$ signal the flip-flop R1S also goes to zero and this occurs at the start of time D10.

Block FP, comprising a NOR gate and one flip-flop, is reset by signal CANC when the timing signals are being started. There is at the input of block FP a decoded signal for each signal D3–D9, which signal is indicated by SABCDE and whose function is to time the input given by the signal BI representing the series of bits being written in the store, to wit, a series of bits placed, as already mentioned, in positions 3 to 9 of the store cell comprising ten positions.

When the first bit, i.e., the first "one" (BI) is required to be recorded in the memory, block FP is activated, at the second bit BI it is reset, and at the third bit it is activated yet again.

Thus, after an odd number of bits, i.e., of "ones" of the character being written in the store, block FP is in condition ONE. Then at time D9 the bit of service character AS, the negated signal of the signal produced by block FP (i.e., $\overline{P}$), will zero thus $\overline{D10}=0$, $\overline{GP1}=0$, $\overline{P}=0$, $\overline{SCR}=0$. These are applied to NOR gate N9 thereby causing the production of an output signal BIPA which will activate and change the state of flip-flop R1L, the last one of the even bit register BP. The condition $\overline{GP2}=0$, $\overline{RIL}=0$, $\overline{SCR}=0$ will cause an output from the "AND/OR" writing block, or, in other words, direct writing in the store of a bit BI which will be the parity bit of the character AS. The next arrival of signal D1 resets the block FP.

Flip-flop FF1, which at the start of the time signals is reset by the signal CANC that is applied at the flip-flop's direct reset input, is activated by the leading edge of the signal SY which is applied at the direct set input.

Signal BU representing the bits emitted from the delay line store acts on the univibrator UNR, whose output is given by the signal $\overline{UNRA}$ so that, if there are not output bits BU, $\overline{UNRA}$ will be at zero which prevents direct activation of flip-flop FF1 following NOR gate N3, but permits the first G1 signal entering NOR circuit N2 to reset flip-flop FF1 by the direct reset input.

Flip-flop FR1, which is activated by signal SY, switches and resets with the first $\overline{GP1}$ signal thereby enabling, by its output $\overline{R1}$, the first flip-flop R17 of the odd bits register BD to switch on arrival of the first $\overline{MS2}$ signal.

It should be noted that flip-flop FR1 remains in the reset condition until flip-flop FF1 changes over (i.e., until the signal of the bits emitted from the memory (BU) goes to ONE).

Resuming the above description, in correspondence to time D10 conditions $\overline{SCR}=0$, $\overline{D10}=0$, $\overline{GP2}=0$ exist which, when decoded by NOR gate N15, produce signal Ss which performs two functions:

(1) It activates flip-flop FR1 whereby, conditions $\overline{GD2}=0$, $\overline{R1}=0$, $\overline{SCR}=0$, $Ds=0$ being established, AND/OR writing block writes into the store at time D1 a bit B1; to wit: the service bit "bs";

(2) It activates flip-flop FITE which orders the end of time.

Flip-flop FDs, previously reset by CANC, switches on arrival of signal $\overline{D5}$ obtained by decoding counter ABCDE while signal Ds will, due to the masking delay and still in the presence of signal D5, cause switching of flip-flop FLG, which was reset by signal CANC at the start of the timing signals, whereby flip-flop FLG will remain set until the next time signal D5.

Now, at the start of the second decoding cycle, the condition $\overline{D1}=0$, $\overline{LG}=0$, $GD2=0$ will arise at the first D1 so that the output from NOR gate N16 is signal S1 which activates flip-flop FR2, whereby the occurrence of conditions $\overline{GP2}=0$, $\overline{R2}=0$, $SCR=0$ $Ds=0$ permits the AND/OR writing block to introduce service bit "b1" into the store, which event occurs at time D2 of the second cycle.

As has already been explained, flip-flop FITE is in the set condition, but then at time D8 of the second cycle signal $\overline{D8}$ resets it and with its fall the signal emitted from the flip-flop (FITE*) resets flip-flop FSYNC, which is in the set condition, thereby blocking the timing.

In the store there is service character As followed by parity bit APS and service bits "bs" and "b1." Having circulated in the store the bits are now emitted. Bits BU emitted from the store transducer, enter monostable circuit UNR which has a period slightly less than that of the bits. In FIG. 5b the temporal relationships of the signals concerned in regeneration of the characters circulating in the store are shown.

The leading edge of the bit in the seventh position of the service character AS, i.e., signal $\overline{BT}$, triggers block UNIV26 which generates signal SY and repeats the functions hereinbefore described, or, in other words, its trailing edge starts the timing. Signal SY lasts about $(2+\frac{1}{4})T$, where T is the bit period, and on directly entering flip-flop FF1 causes the later to be activated by means of its leading edge. When signal SY terminates, signal $\overline{UNRA}$ will be equal to 0 by reason of the presence of the service bit "bs" at the store output, as can be seen from FIG. 5b.

When signal $\overline{UNRA}$ is equal to 1, flip-flop FF1 is reset by the trailing edge of timing signal $\overline{G1}$, i.e., at time D1. The leading edge of signal SY activates flip-flop FR1 as well as flip-flop FF1.

Flip-flop FDs was reset at the end of timing, so that with the first signal $\overline{GD2}$ there arise the conditions $\overline{R1}=0$ $\overline{GD2}=0$ $Ds=0$ $SCR=0$, wherefore the AND/OR writing block will write in the store the first bit B1 in position D9, i.e., the service character AS. Before the end of the previous timing, flip-flop FF1 was reset by the signal $\overline{G1}=0$, so that, with such authorization, flip-flop FR2 is reset by the first drop to zero of signal $\overline{GD1}$, as is evident from FIG. 5a. In this phase of regeneration of the stored bits (FIG. 5b) the first signal $GD1=0$ activates flip-flop FF2, as authorized by flip-flop FF1 which is in state ONE, thereby realizing the conditions for writing in the store of the parity bit APS, i.e., $\overline{GP2}=0$, $\overline{R2}=0$, $SCR=0$ $Ds=0$, as effected by the AND/OR writing block.

Before flip-flop FR1 resets (and this is possible since flip-flop FF1 is already in the zero state) on arrival of condition $\overline{GP1}=0$, i.e. at time D2, there arise conditions $\overline{GD2}=0$ $\overline{R1}=0$, $SCR=0$, and $Ds=0$ which allow the AND/OR writing block to rewrite service bit "bs" in the store in position D1. At time D3, i.e., with the next trailing edge of the signal $\overline{GD1}$, flip-flop FR2 will be reset, but before this there arise the conditions $\overline{GP2}=0$ $\overline{R2}=0$, $SCR=0$, and $Ds=0$ which allow the AND/OR block to rewrite service bit "b1" in the store in position D2. At time D8, as already mentioned, the timing terminates and the regeneration cycle as already described will be repeated after the store delay.

For a character, originating from the keyboard or by the line controller from line, to be written into the store, it is necessary for there to be a signal, likewise originating from the keyboard or line controller, for the purpose of writing the character into the two registers BD and BP. This signal is called ICCA if the character to be written in the store originates from the line, and ICTA if it originates from the keyboard. The procedure for reading into the store is the same whether the character to be written originates from the keyboard or from the transmission line.

Assume that the signal ICCA arrives. This signal allows registers BD and BP to be filled with the character emanating from the line controller on links LIN1–8 and also activates flip-flop FPR1 whose output, with the authorization of signal $\overline{D5}$, activates flip-flop FPR2. Meanwhile, at time D8, the timing terminates, as already pointed out, so that flip-flop FPR2 remains activated until the next time D5. On the start of a new timing sequence after the store delay, there is applied to NOR gate N7, at time D10, signals $\overline{PR2}$, $\overline{D10}$ and $\overline{R1}$ so that the output will, as can be seen from FIG. 5d, be a signal $\overline{MSC}$ whose negation activates block FSCR on arrival of signal $\overline{D1}$. It should be noted that at time D10 the conditions for emitting signal Ss from NOR gate N15 are not fulfilled, because $\overline{SCR}=1$; nor likewise is the signal MCL emitted from the NOR gate N8 because $PR2=1$. For these reasons flip-flop FITE is not activated and the timing will not end at the following time D8.

Hence, by virtue of signal MSC, $\overline{SCR}$ will equal 0 until the next time D1 and in such case the service bit "bs" cannot be rewritten in the store according to the conditions previously described. However, the service bit "b1" in position D2 must be rewritten in the store before the character originating from the line.

To this end, upon application to NOR gate N14 of signals $\overline{SCR}=0$, $\overline{F2}=0$, $\overline{D1}=0$, $\overline{GD2}=0$, output P1 forces flip-flop R1L to 1, which is the last one of even bit register BP, whereby the conditions $\overline{GP2}=0$, $\overline{R1L}=1$, $\overline{SCR}=0$ that occur at time D2 allow the AND/OR writing block to write service bit "b1" into the store. The even and odd bit registers BP and BD, which have been loaded with signal ICCA and signals LIN1–8 representing the character emanating from the line, are shifted as already mentioned, in accordance with the repetition frequency of signals $\overline{MS1}$ and $\overline{MS2}$ so that under conditions $\overline{GP2}=0$, $\overline{R1L}=0$, $\overline{SCR}=0$ and $\overline{GD2}=0$, $\overline{R1S}=0$ for the even bit register BP and the odd bit register BD, respectively, the AND/OR block will write bits BI of the character shifted from the register BP and BD in positions D2 to D9 of the store cell. As previously mentioned, at time D10 there is formed signal BIPA which allows introduction of the parity bit into the store. At the same time, the condition $\overline{SCR}=0$, $\overline{D10}=0$, $\overline{GP2}=0$ arise so that NOR gate N15 will emit signal Ss which activates flip-flop FR1 and flip-flop FR1 and flip-flop FITE which orders the end of timing. Now, with conditions $\overline{GD2}=0$, $\overline{R1}=0$, $\overline{SCR}=0$, and $\overline{Ds}=0$, and AND/OR writing block can write in position D1 the service bit "bs" after the parity bit previously written, thus putting a sign distinctive of the last characters written into the store.

As previously mentioned in the description of the regeneration of the bits circulating in the store, the leading edge of the seventh and only bit of service character AS causes activation of flip-flop FF1. But, as already stated and as may be seen from FIG. 5b, if at the end of signal SY the signal $\overline{UNRA}=0$, then signal $\overline{G1}$ will not reset flip-flop FF1, but if the signal $\overline{UNRA}=1$, signal $\overline{G1}$ will reset flip-flop FF1. Hence, as may be seen from FIG. 5c, at time D10 signal BU represents the service bit "b1" (it being assumed in FIG. 5c that only one character is present in store 30) whereby flip-flop FF1 assumes condition ONE. But flip-flop FR1 is reset if flip-flop FF1 should be in the zero condition on arrival of GP1, wherefore stage FR1 will be reset at the first time D10 seeing that, although switched to ONE at the start of this time owing to absence of the service bit "bs" in the store output, flip-flop FF1 has not yet had time to act on the said FR1 owing to the masking delay.

Figure 5C:
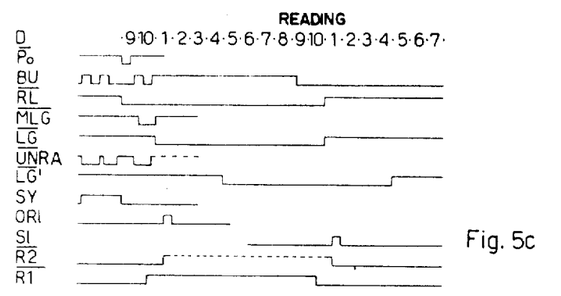
Figure 5D:
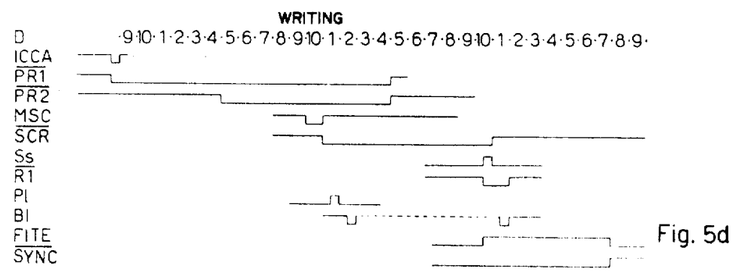

These considerations having been assumed, the request for the stored character arrives, for example, with the signal Po sent, as previously stated, by the mechanical program of the apparatus and, on arrival of the signal indicating authorization to print ($\overline{CSO}=0$) from the transmission controller, flip-flop FRL is set (see FIG. 5c).

In accordance with the foregoing procedures, the following conditions are obtained: $\overline{RL}=0$, $\overline{D10}=0$, $\overline{FF}=0$, and $\overline{R1}=0$ wherefore at the output from the two NOR gates 2N11 there will be a signal MLG which activates flip-flop FLG and, upon an output from the NOR gate N12, signal LG will be applied to NOR gate N13 together with signals $\overline{D1}=0$ and $\overline{GD2}=0$, thereby generating signal OR1 which sets flip-flop FR2 so as to give $\overline{R2}=1$ and so prevent regeneration of service bit "b1" in delay line store 30. At the repetition frequency of signals $\overline{MS2}=0$ and $\overline{MS1}=0$ the odd bits of the character present in the store are shifted under action of flip-flop FR1 (whose ouput varies according to the presence or absence of "ones" in the odd position of the store cell) in store register BD, while the same thing happens to the even bits of the aforesaid character under action of flip-flop FR2 (whose output varies according to the presence or absence of "ones" in the even positions of the store cell) in store register BP. After five signals, respectively $\overline{MS2}=0$ and $\overline{MS1}=0$, the register is full but at the same time flip-flop FR1 and FR2 have provided for regeneration through the AND/OR writing block in the store of the aforesaid bits, for which reason the character does not disappear.

Flip-flop FLG' is set in the middle of the character by signal $\overline{D5}$ so that under the conditions $\overline{LG'}=0$, $\overline{D1}=0$, and $\overline{GD2}=0$ signal S1 will be emitted from NOR gate N16 and through operation of the AND/OR writing block, service bit "b1" will be rewritten in the store in the next D2 position. At the next time D5 the FLG' stage will be reset.

Another reading order, i.e. $\overline{LG}=0$, must then be awaited and then in the next cycle when the service bit "b1" is again encountered the procedure already described will recommence. This is the normal procedure of reading from delay line store 30 but for reading the first character present in the said store the procedure is different. In effect, signal CSO indicating authorization to print is applied to NOR gate N17. There is then emitted signal $\overline{TR}$ which activates flip-flop FNOK whose output $\overline{NOK}$ sets flip-flop FLG at time D1, whereby and as evident, on activation of this flip-flop, the two registers BD and BP are filled in accordance with the procedure already described. When the request arrives from the mechanical program of the accounting machine, i.e. the signal Po, then by authorization of signal CSO stage FRK switches whereby registers BD and BP are filled with the new character, the previous character having been already passed to the mechanical accounting machine.

The line controller

Pursuant to the description of the dialog procedure between computer and terminal, a description of the logical circuitry is now given by means of which the procedure is brought to pass, which logical circuits constitute, as already stated in the initial general description of the entire system, line controller unit 40. This line controller unit interacts with store controller 20 and the message transmission unit or serializer-distributor 50 to allow the flow of data from the transmission line to the terminal and from the terminal to the line.

Figure 6:
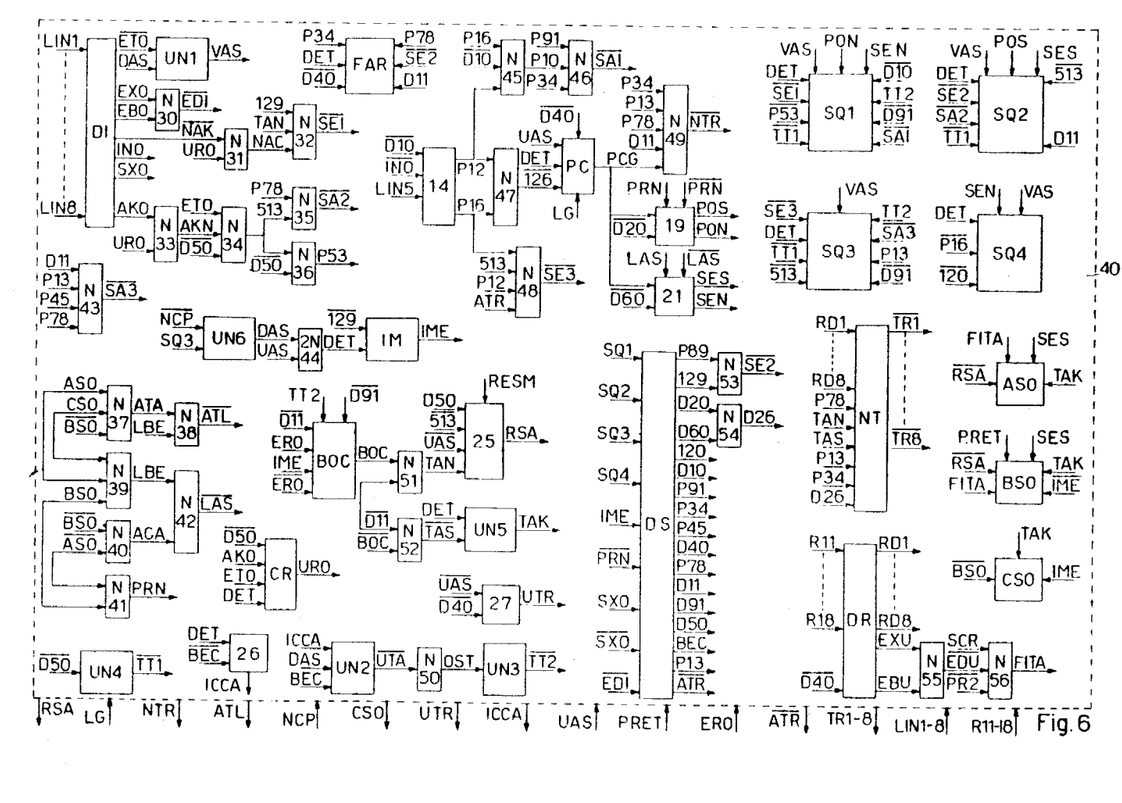
FIG. 6 is a block diagram of a transmission control unit.

Referring to FIG. 6, which shows a block circuit diagram of line controller 40, it is seen that the dialog starts, as already mentioned, with dispatch from the central data processor of character EOT which is put in parallel by distributor 50 and sent by links LIN1–8 to the decoding block DI which emits signal $\overline{ETO}$. This signal removes an inhibition on univibrator UN1.

Flip-flops SQ1, SQ2, SQ3, and SQ4 count the sequential state of the system and are at the start of operation in their reset state, i.e., in state (0). Counting is in accordance with a cyclic binary code.

The trailing edge of signal DAS, obtained from univibrator UN6 on arrival of signal $\overline{NCP}$ from distributor 50 indicating the presence of a character originating from the line, gives the order to univibrator UN1 which, having been freed from inhibition as aforestated, produces signal VAS. The latter signal acts on the direct setting input of flip-flop SQ1 and the direct reset inputs to flip-flops SQ2, SQ3, SQ4, placing the flip-flops in state (1).

The character EOT is followed by the address character of the terminal being interrogated in the "sounding" or "selection" proceed.

"Sounding" is distinguished from "selection" by the presence of a "1" bit in the fifth position. The address thus arrives from the serializer-distributor 50 by the inputs LIN1–LIN8 and is recognized by block DI and decoded with signal INO. The ensemble of NOR decoding block 14 recognizes whether the information given by the fifth bit is "sounding" or "selection" and emits signal P12 or P16 respectively. Thus there is applied to block 14 the negated signal $\overline{D10}$ obtained by decoding the state (1) by means of decoding block DS and the negated signal of the received address, to wit $\overline{INO}$, and the signal present in LIN5 characterising the "sounding" or "selection" request. If after reception of character EOT no further character arrives at the terminal, the latter will, as already ascertained in the conversation procedure, return to state (0) after a waiting time TO2. This is secured by means of univibrator UN3 which produces signal $\overline{TT2}$. The trailing edge of signal $\overline{TT2}$ resets flip-flop SQ1 under authorization of signal $\overline{D10}$ obtained by decoding state (1). The signal $\overline{TT2}$ is obtained under the action of the trailing edge of signal DAS which, since the authorizing signal BEC for the univibrator is at zero level, produces signal $\overline{UTA}$, thereby causing NOR gate N50 to provide signal OST whose leading edge causes univibrator UN3 to start and generate $\overline{TT2}$.

If neither the "sounding" nor "selection" characters are recognized, i.e. if both P12 and P16 are at zero level, then the terminal will return to state (0) by virtue of the falling edge of signal DAS applied to two NOR gates represented by 2N44 whose output DET resets flip-flop SQ1, as authorized by signal $\overline{SAI}$ obtained from NOR gate N46, resulting from signal P10 output from NOR gate N45, whose input is constituted by the signals P12, P16 and the negated state (1) signal $\overline{D10}$.

Now assume that the terminal has received a "sounding" request so that signal P12 will be at level ONE. The output from NOR gate N48, that is $\overline{SE3}$, passes to zero level and authorizes setting of flip-flop SQ3. The fall of signal DET sets the flip-flop and causes passage to state (2). The decoding block DS represents a group of NOR gates for decoding the states of the terminal so that the decode of state (2) is given by signal D20 which, on entry to NOR gate N54, produces signal D26 which acts on output block NT thereby sending the proper address via outputs TR1–TR8 leading to the serializer-distributor 50. Meanwhile, by means of signal DET, and as authorized by the signal $\overline{126}$ output by NOR gate N47, flip-flop PC signals to serializer 50 the presence of the address character to be transmitted, sending the signal $\overline{NTR}$ from NOR circuit N49, at whose input is signal PCG. It must then be determined whether on receipt of the "sounding" request, the terminal is ready to transmit or not, or in other words, it is necessary to discover in what state the terminal is. Fall of signal PCG as authorized by the negated state (2) signal $\overline{D20}$ enters block 19 composed of 3 univibrators which are also authorized by signals PRN and $\overline{PRN}$ at level ONE and level ZERO respectively in the case where the terminal is ready to transmit. Thus, at the output from block 19 there will, if the terminal is ready to transmit, be signal POS and, in the contrary case, signal PON. Now the terminal is ready to transmit when it is in the "assigned to computer" condition. The units which staticize the conditions of the terminal are flip-flops ASO, BSO, and CSO.

When flip-flop ASO is set, the terminal is in the condition "assigned to computer," when flip-flop BSO is set it is in the condition "assigned to keyboard," and when flip-flop CSO is set it is in the condition "assigned to printer." When all three flip-flops ASO, BSO, and CSO are deactivated, the terminal is in the "free" condition. The terminal is in the condition requested by the "sounding" when there is in store 30 a whole block of characters with the character ETX or ETB in the last position. Introduction to the store of a message, preceding as previously mentioned by a reservation, is effected by the keyboard. The reservation order PRET acts on the set input of flip-flop BSO whose output produces via NOR gates N37 and N38 signal $\overline{ATL}$ indicating the "assigned to keyboard" or "free" state of the terminal. The terminal leaves the "assigned to keyboard" state on introduction to store 30 of the end of block character ETX or ETB.

In fact, the decode of the signals coming from flip-flops R11–R18 of store registers BP and BD gives, on output from block DR, signal EXU or EBU for the decode of the characters ETX and ETB respectively, in order to obtain signal FITA via NOR gates N55 and N56. The signal FITA is applied by the set input to flip-flop ASO and the reset input to flip-flop BSO. The terminal is thus in the condition "ready to transmit," i.e. the output PRN from NOR gate N41 is at level ONE so that $\overline{PRN}$, at level ZERO, authorizes output of the signal POS from block 19. The signal POS sets flip-flop SQ2 thereby sending the terminal into state (3). Signal P34, the decode of state (3), is applied to block NT to cause the dispatch of character STX to the serializer-distributor 50 and is applied to NOR gate N49 to generate signal $\overline{NTR}$, which latter advises serializer 50 of the presence of a character to be serialized; at the same time, via NOR gate N46, it causes the output of signal $\overline{SAI}$ which authorizes reset of SQ1. At the end of this serialization the serializer sends signal UAS which, via the two NOR gates 2N44, produces signal DET and consequently passage of the terminal to state (4), with reset of flip-flop SQ1.

The decoded state (4) signal D40 causes, via NOR gate N17, as shown in FIG. 4, output of the signal $\overline{TR}$ which sets flip-flop FNOK, wherefore output signal $\overline{NOK}$ in turn activates flip-flop FLG, thereby giving the order for retrieval of the first character of the character block contained in the store. Reading of the character is established, as previously mentioned, by signal LG whose fall to zero will, in the presence of authorization $\overline{D40}$, activate flip-flop PC and produce via NOR circuit N49 signal $\overline{NTR}$, i.e., the report to serializer 50. The signal UAS returned by the serializer in conformation of completed serialization, resets flip-flop PC. The subsequent orders for retrieval from store 30 of fresh characters are furnished by signal UTR obtained at the output from univibrator 27 as authorized and ordered by signals $\overline{D40}$ and $\overline{UAS}$ respectively; in effect (see FIG. 4) signal UTR produces signal $\overline{RL}$ and, via the two NOR gates 2N11, signal MLG which activates flip-flop FLG and thereby initiates reading.

The NOR decoding circuits DR conditioned by signal $\overline{D40}$ provide the character extracted from store register R11–R18 as an output on wires RD1–RD8 for dispatch to the serializer 50, via other NOR decoding circuits NT on lines TR1–TR8. Recognition of character ETB or ETX by decoding block D1 furnishes signal EBO or EXO respectively and produces through NOR gate N30 signal $\overline{EDI}$ which conditions the decoding of state (4) as given by signal P45. The signal P45 will then, through NOR gate N43, give signal SA3 which authorizes reset of flip-flop SQ3 whereby on arrival of signal DET 11. the terminal will assume state (5) of awaiting reply. If the character which arrives is ACK, then its decode AKO will, through NOR gate N33, enter NOR gate N34 together with signals $\overline{D50}$, the negated state (5) signal and ETO which expresses the non-receipt of signal EOT. The signal 513 provided by the NOR gate N34 produces at the output from NOR gate N35 signal $\overline{SA2}$, which authorizes reset of flip-flop SQ2; and at the output from NOR gate N48, the signal $\overline{SE3}$ which authorized setting of flip-flop SQ3. Passage to state (13) occurs on arrival of signal DET which sets flip-flop SQ3 and resets flip-flop SQ2. Together with passage to state (13), with the authorization given by signal $\overline{513}$ to the block 25 comprising 2 univibrators and various NOR gates, the falling edge of the state (5) signal D50 produces signal RSA which clears store 30 by operating circuit UNIVAZZ, authorized by the signal $\overline{ATL}$, as indicated in FIG. 4 Coterminously therewith, signal $\overline{RSA}$ puts the terminal into the "free" condition by deactivating flips-flops ASO and BSO and hence also CSO. In state (13) the character EOT must be transmitted on conclusion of the connection, as described in the dialog procedure. The signal P13, which is the decode of state (13), permits character EOT to be supplied to decoding block NT and, at the same time, advises the serializer 50 by means of signal $\overline{NTR}$. The signal P13 also authorizes reset of flip-flops SQ3 so that, on arrival of signal DET, this flip-flop is reset and the terminal returns to state (0).

Should there arrive from the computer, or more, precisely, from distributor 50, character NACK, then the latter's decode $\overline{NAK}$ from block DI at level ZERO will enter NOR gate N31, together with signal URO indicating the forth repetition of the message whereby, as the terminal is not required to repeat the message for the fourth time, the output signal NAC will be at level ONE and will apply signal $\overline{SEI}$ to level ZERO through NOR gate N32. Signal $\overline{SEI}$ authorizes setting of flip-flop SQ1 so that, on arrival of signal DET, the said flip-flop will be set and bring the terminal to the start transmission state (3). The negated of state (5) signal $\overline{D50}$, signal AKO which at ZERO level indicates non-receipt of character ACK, and signal EOT which indicates non-receipt of the character EUT, enter block CR composed of NOR circuits and two counting flip-flops, wherefore, on arrival of signal DET, counting of the repetitions will start; after the message has been repeated thrice, i.e., after state (5) has occurred three times without reception of character ACK, there is provided signal URO, which puts the signal NAC to level ZERO at the output from NOR gate N31 and consequently puts signal $\overline{SEI}$ to level ONE, thereby preventing passage of the terminal to state (3). Should the terminal have received none of characters ACK, NAC, or EOT, then, on elapse of the waiting time TO1, the terminal is brought to state (3). In effect, the negated state (5) signal $\overline{D50}$ enters univibrator UN4 whereby signal $\overline{TT1}$ is formed, whose falling edge causes setting of flip-flop SQ1, this having been authorized by signal $\overline{P53}$. If the fourth repetition of the message has been counted, then signal AKN will be at level ZERO and signal 513 at level ONE so that passage of the terminal to state (3) does not take place; on the contrary, signal $\overline{513}$ authorizes resetting of flip-flop SQ2 and setting of flip-flop SQ3, so that, on arrival of signal $\overline{TT1}$, the terminal assumes state (13). If the fourth repetition is required to be made because of receipt of signal NACK, then resetting of flip-flop SQ2 is authorized by signal $\overline{SA2}$ and setting of flip-flop SQ3 by signal $\overline{SE3}$, so that, on arrival of signal DET, the terminal assumes state (13).

When the message is sent, formation of the character for the redundancy check on the block to be transmitted, must be exempt from the start of block service character, for which reason the redundancy register must first be cleared, this being assured by the decoded state (3) signal P34 which sets the flip-flop FAR which in turn clears the redundancy register. When formation of the redundant character is to be started, flip-flop FAR has to be reset and this happens with the terminal in state (4), since resetting of flip-flop FAR is authorized by signal D40, wherefore on arrival of signal DET the flip-flop assumes the ZERO state. Thus, character STX is excluded from formation of the redundant character.

If the terminal receives a "selection" request character, signal P16 will be at level ONE, and through NOR gate N48, signal $\overline{SE3}$ will be at level ZERO. Setting of flip-flops SQ3 and SQ4 is authorized respectively by signals $\overline{SE3}$ and $\overline{P16}$. From the distributor 50 there arrives signal NCP reporting the presence of a character, and this signal generates signal DET which acts on flip-flops SQ3 and SQ4 causing passage of the terminal to state (6). The signal D26 obtained from decoded signal D60 of state (6) by way of NOR gate N54, causes transmission of the terminal's address on TR1–TR8.

At this point it must be determined whether the terminal is in a position to receive a message from the computer, i.e. whether it is in the "free" or the "assigned to computer" conditions. These two conditions are respectively reported by signals LBE and ACA which enter NOR gate N42 whose output $\overline{LAS}$ will, if one of the two aforesaid conditions does in fact exist, be at level ZERO. The negated state (6) signal $\overline{D60}$ authorizes block 21, composed of three univibrators which are again authorized by signal $\overline{LAS}$ and its negation LAS. When the address has to be transmitted, serializer 50 must be advised, whereby, after signal $\overline{I26}$ from NOR gate N47 has authorized setting of flip-flop PC, the master DET will cause output of signal PCG and, through NOR gate N49, of signal NTR.

After serializer 50 has serialized the address character, it sends signal UAR which resets flip-flop PC so that the falling edge of signal PCG acts on block 21, causing output of signal SES, if the terminal is in a position to receive a message, or of signal SEN if it is not. The signal SES sets flip-flops ASO and BSO, causing or reconfirming the "assigned to computer" condition of the terminal. The signal SES also sets flip-flop SQ2 and so brings the terminal into state (7). If the computer is not in the condition to be able to receive the signal, the signal SEN will set flip-flops SQ1 and SQ4 and so bring the terminal into state (13) wherein it will transmit character EOT. The decoded state (7) signal P78 allows, after block NT, transmission on TR1–TR8 of character ACK and acts on the input to NOR gate N49 to inform serializer 50 of signal $\overline{NTR}$ of the presence of a new character to be serialized.

The signal P78 also produces signals $\overline{SA2}$ and $\overline{SA3}$ which respectively authorize resetting of flip-flops SQ2 and SQ3 so that, on arrival of signal DET, the terminal will pass into state (8) wherein it awaits arrival of character STX from the distributor 50, i.e. from the central data processor with which it is connected. If character EOT arrives, then that character's decode, signal $\overline{ETO}$, will authorize the univibrator UN1, wherefore on arrival of signal DAS, produced by virtue of the signal $\overline{NCP}$, there is produced a signal VAS that sets the flip-flop SQ1 and resets flip-flops SQ2, SQ3 and SQ4, thereby returning the terminal to state (1). If character STX arrives, then signal P89, which is the decode of state (8), conditioned by signal $\overline{SXO}$ that is in its turn negated by the decode of STX, will rise to level ONE thereby putting, through NOR gate 53, signal $\overline{SE2}$ to level ZERO so that on arrival of signal DET, the terminal assumes the reception of text state (9). The decode of state (9) conditioned by signal IME, which will be explained later, is signal BEC, whose negation authorizes block 26 composed of a flip-flop and a univibrator. On arrival of a character in the serializer-distributor 50, there occurs signal DET which allows output of signal ICCA from block 26, the rising edge of which latter signal allows filling of store registers BP and BD. The falling edge of signal ICCA causes univibrator UN2 to generate signal $\overline{UTA}$ and, through NOR circuit N50, signal OST which commands the univibrator UN3 which then generates the signal $\overline{TT2}$ representing the length of waiting time TO2.

Should there be a line interruption or should the character ETX or ETB not be received at the end of the message, signal $\overline{TT2}$ will rise because it is no longer maintained at zero; therefore, its negation TT2 goes to level ZERO, resetting flip-flop BOC which has been authorized by signal $\overline{D91}$ that takes account of the decodes of states (9) and (10).

The same signals TT2 and $\overline{D91}$ act on the resetting input to flip-flop SQ1 and on the setting input to flip-flop SQ3, thereby putting the terminal into state (11). In its turn, the decoded state (11) signal D11 resets flip-flop SQ2, though still maintaining the terminal in state (11), which state in fact comprehends both the set and reset states of flip-flop SQ2. The signal from flip-flop BOC enters with the negated state (11) signal $\overline{D11}$ into NOR circuit 51 which provides signal TAN, which transmits character NACK via lines TR1–TR8 to serializer 50 and then to the transmission line after having first activated an error lamp. The signal TAN further causes output of signal $\overline{SEI}$ which authorizes setting of flip-flop SQ1, while signal D11 through NOR circuit N43 causes output of signal $\overline{SA3}$ which authorizes resetting of flip-flop SQ3. On arrival of signal DET, which occurs on dispatch of signal UAS by serializer 50, flip-flop SQ1 is set and flip-flop SQ3 reset, whereby the terminal is brought into state (8). Coterminously with passage to state (8), store 30 is cleared by action of signal RSA fed from block 25, consisting of two univibrators and two NOR gates, to whose input is sent signal $\overline{UAS}$ as authorized by signal TAN.

If either of character ETX or ETB arrive according to rule at the end of the block of information, the respective decoding signals EXO or EBU will be at level ONE and, through NOR circuit N30, signal $\overline{EDI}$ will be at level ZERO. The state (9) decode conditioned by signal $\overline{EDI}$, i.e. P91, sends signal $\overline{SAI}$ to level ZERO, thereby authorizing resetting of flip-flop SQ1 which then switches on arrival of signal DET and sends the terminal into state (10). The state (10) decode $\overline{ATR}$ informs serializer 50 of the arrival of the redundant character from the line. Signal P78 assures, via flip-flop FAR, clearing of the redundancy register present in serializer-distributor 50; signal P89 produces, through NOR gate N53, signal $\overline{SE2}$ which, on arrival of signal DET allows, likewise through flip-flop FAR, formation of the redundant character. Thereafter, the state (11) signal D11 again clears the redundancy register. Naturally, on arrival of character ETX or ETB, signal OST is still present and will likewise trigger the waiting time as described heretofore. Meanwhile, signal ATR enters NOR circuit N48 and causes signal $\overline{SE3}$ to fall to level ZERO, which authorizes setting of flip-flop SQ3, wherefore the said flip-flop is set on arrival of signal DET and puts the terminal into state (11).

If the check on the redundant character should indicate incorrect operation, then there will arrive from distributor 50 signal $\overline{ERO}$ which authorizes resetting of flip-flop BOC, so that, on arrival of signal $\overline{D11}$, which is the negation of the state (11) decode, flip-flop BOC will be reset and bring signal TAN to level ONE, which signal will, as already said, cause the reply NACK to be sent from block NT, while signal $\overline{NTR}$ serves to report to serializer 50 the presence of a character to be serialized. Then, as already mentioned, signal $\overline{SEI}$ authorizes setting of flip-flop SQ1 and signal $\overline{SA3}$ authorizes resetting of flip-flop SQ3, so that on arrival of signal DET, the terminal is brought to state (8). If the redundancy check indicates correct operation, then there will arrive from the serializer-distributor 50 signal ERO which authorizes setting of flip-flop BUC so that, on arrival of signal $\overline{D11}$, flip-flop BOC will be set and, through NOR circuit N52, bring signal $\overline{TAS}$ to level ONE, the negation of which latter signal causes output from decoding block NT of character ACK.

The signal D11 causes output from NOR circuit N43 of signal $\overline{SA3}$ which authorizes reset of flip-flop SQ3, so that, on arrival of signal DET, the flip-flop SQ3 is reset and the terminal thereby passes into state (12). The signal $\overline{TAS}$ authorizes the univibrator UN5 which, on arrival of the signal DET, generates signal TAK, which sets flip-flop CSO and thereby puts the terminal in the "assigned to printer" condition.

In state (12) the terminal awaits a reply from the computer. If the character EOT should arrive, then signal VAS from the univibrator UN1 will bring the terminal to state (1). If character STX arrives, this will mean that the computer is redispatching a message that has already been replied to by character ACK. It is therefore necessary to return to state (9), while prohibiting introduction of the character into the store, observing that they have already been correctly received, and, at the same time to force the character ACK as a new reply.

Signal 129 is the decode of state (12) conditioned by the signal $\overline{SXO}$. Its negation authorizes flip-flop IM so that the latter is then activated on arrival of signal DET.

The signal IME from flip-flop IM sets flip-flop BOC thereby allowing dispatch of character ACK to the computer. Signal 129 also simultaneously produces signal $\overline{SEI}$, which autorizes setting of flip-flop SQ1, and signal $\overline{SE2}$ which authorizes seting of flip-flop SQ2 so that, on arrival of the signal DET, the terminal enters state (9). The presence of signal IME disallows output of signal BEC from block DS so that the character arriving at the storage register is no longer reported by signal ICCA. If, on the other hand, no recognizable character arrives, the terminal will pass to state (0) as a result of action exerted on the reset input to flip-flop SQ4 by signal DET and signal $\overline{120}$ whose negation 120 is the decode of state (12) conditioned by signal SXO, in consequence of which the terminal returns to await the next dialog.

It will be evident that many minor changes may be made in the apparatus described herein, without departure from the scope of the invention. Accordingly, the invention is not to be considered limited by such description, but only by the scope of the appended claims.

What is claimed is:

1. A data transmission system having a central computer and a terminal apparatus for transmitting and receiving data in the form of blocks of characters therebetween, the terminal apparatus comprising a programming unit responsive to service characters associated with blocks of characters constituting the data and transmitted by the computer to cause programmed sequences of operations to be performed to control function of the terminal apparatus, and operative to free said computer to perform its own program between said blocks of characters and after the end of the data.

2. The data transmission system recited in claim 1 wherein said programming unit includes an accounting machine having a programming device associated with the carriage of the accounting machine,     the accounting machine further having a mechanical buffer store and a store for storing one block of characters, said store being operative during reception of data transmitted by the computer to systematically enter received characters into the store until reception of a character indicating the end of a block, said programming device being responsive to reception of a character indicating the end of a block to advance said carriage to a position in which the programming unit causes the characters to be read out of the store and posted in the mechanical buffer store of the accounting machine.

3. The data transmission system recited in claim 2 wherein the programming device comprises a programming bar.

4. The data transmission system recited in claim 2 wherein the programming unit is responsive to service characters preceding groups of characters to select different program sequences for the accounting machine.

5. Terminal apparatus for transmitting data to and receiving data from a central computer, the data being in the form of blocks of characters, comprising:
- a recirculating delay line store for storing a single block of characters,
- a store controller operative such that at least one service signal is available for controlling the timing of regeneration, reading and writing of blocks of characters, said store controller also being operative to free said central computer between intervals of receiving said blocks.

6. The terminal apparatus recited in claim 5 wherein the service signal is always present and circulating in the store for controlling the timing of regeneration, reading and writing of blocks of characters.

7. The terminal apparatus recited in claim 5 further comprising data utilization means, and a line controller to control transmission of data to the computer,
- the store controller being further operative to control the reading of a block of characters for supply to the utilization means or to the line controller for transmission to the computer, through recall of the characters one by one by recognizing a first service signal at the start of the first character of the block and shifting the first service signal to the start of successive characters as the character by character recall proceeds.

8. The terminal apparatus recited in claim 7 wherein the store controller is further operative to enter characters into the store one by one and shift a second service signal to the end of the last character entered denoting the end of the block of characters written in the store.

9. The terminal apparatus recited in claim 8 wherein the second service signal orders the end of the timing.

10. The terminal apparatus recited in claim 5 wherein the store controller is further operative to enter characters into the store one by one and shift a first service signal to the end of the last character denoting the end of the block of characters written in the store.

11. The terminal apparatus recited in claim 10 wherein the first service signal orders the end of the timing.

12. The terminal apparatus recited in claim 8 wherein both the first and second service signals are always present and circulating in the store.

13. Terminal apparatus for the transmission of data to and the reception of data from an associated central data processor, the data being in the form of information blocks, comprising:
- an accounting machine having a programming unit,
- a store for containing at least one block of information, and electrically operable with said programming unit, and
- a control unit to control the functions of the terminal apparatus through said store such that each of said blocks of information is divided into a sequence of states established at the time of the dialog with the associated central data processor determining the function of a single part of the apparatus; said central data processor being free from said terminal apparatus during the control operation of said control unit.

14. Terminal apparatus to claim 13 further including peripheral units such as a printer, keyboard or a central unit and wherein the control unit and store have a plurality of operative conditions which determine the availability of the store in its confrontations with said peripheral units, said peripheral units being associated with the central data processor to have access to the store, the conditions being determined by the dialog with the associated central data processor.

15. Terminal apparatus according to claim 14 wherein some of the plurality of operative conditions are determined by the keyboard.

16. Terminal apparatus according to claim 14 wherein the sequence of said states determines some of the plurality of operative conditions depending on the dialog with the associated central data processor.

17. Terminal apparatus according to claim 14 wherein passage from one of said states to the next state of the sequence of states is enabled by the plurality of operative conditions conditioning the dialog with the associated central data processor.

References Cited

UNITED STATES PATENTS

| | | | |
|---|---|---|---|
| 3,400,376 | 9/1968 | McDonnell | 340—172.5 |
| 3,368,203 | 2/1968 | Loizides | 340—172.5 |
| 3,363,234 | 1/1968 | Erickson et al. | 340—172.5 |
| 3,328,763 | 6/1967 | Rathbun et al. | 340—172.5 |
| 3,328,566 | 6/1967 | Kinzie et al. | 340—172.5 |
| 3,324,456 | 6/1967 | Brown et al. | 340—172.5 |
| 3,311,891 | 3/1967 | Brady et al. | 340—172.5 |
| 3,289,171 | 11/1966 | Scherr et al. | 340—172.5 |
| 3,251,040 | 5/1966 | Burkholder et al. | 340—172.5 |

GARETH D. SHAW, Primary Examiner